UNITED STATES PATENT OFFICE.

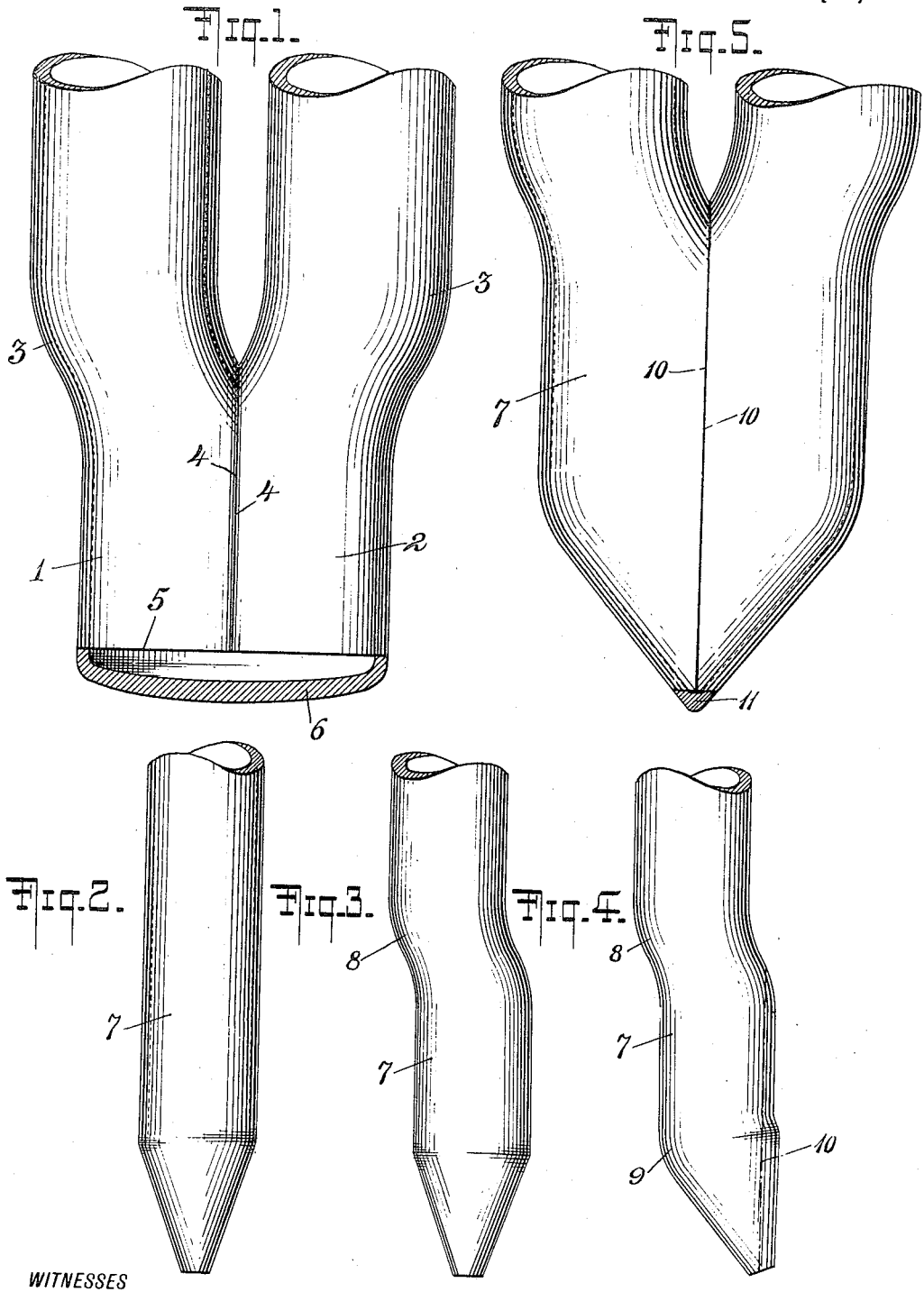

JULIUS KINDERVATER, OF RICHMOND, VIRGINIA, ASSIGNOR TO LOCOMOTIVE SUPERHEATER COMPANY, OF NEW YORK, N. Y., A CORPORATION OF DELAWARE.

METHOD OF MAKING U-SHAPED PIPE-BENDS.

1,138,227.   Specification of Letters Patent.   Patented May 4, 1915.

Application filed July 8, 1914. Serial No. 849,877.

*To all whom it may concern:*

Be it known that I, JULIUS KINDERVATER, a citizen of the United States, and a resident of Richmond, county of Henrico, State of Virginia, have invented a certain new and useful Improvement in Methods of Making U-Shaped Pipe-Bends, of which the following is a specification.

My invention concerns the making of U-shaped pipe bends and particularly such bends when used in connection with boilers, superheaters and generally when exposed to high temperatures or to carry steam or fluid under pressure. My invention may, however, be utilized to advantage in making pipe bends of the class referred to even though such pressure and temperature conditions are absent. Various ways of making bends of the above character for similar purposes have been proposed.

The present invention comprises a method which, as contrasted with known methods, is of extreme simplicity, does not involve special tools or dies, can be carried out by comparatively unskilled workmen, and involves very little waste of material.

The object of my invention is to provide a pipe bend of the character specified which may be simply, easily and economically manufactured as aforesaid; which shall not involve any undue stretching or strain of the pipe walls at any point, and which shall be adapted to withstand high pressures and high temperatures when used under such high pressures and high temperature conditions.

My invention will be better understood by referring to the drawings in which—

Figure 1 represents a plan view (part section) showing two pipes united by a preferred pipe bend made according to my invention; Figs. 2, 3 and 4 show respectively a modified form of pipe according to my invention; Fig. 2 being a side elevation showing the first step; Fig. 3 a side elevation showing the second step, and Fig. 4 a side elevation showing the third step in the method; and Fig. 5 shows a plan view (part section) of the complete pipe bend.

Referring to Fig. 1 of the drawings, 1 and 2 are two pipe lengths whose ends are to be united in a pipe bend. An end of each of these pipe lengths is first approximately squared off. The pipe is then given a reverse bend at a point a convenient distance from the end as at 3, the two portions of the pipe, after the bending, being substantially parallel to one another. Each pipe end is then planed off on the side toward which it has been bent as at 4, the plane of this operation being parallel to the axis of the pipe. If the bending and planing have been accurately done the two planed sides, which now constitute openings into the pipe, may be accurately abutted, as shown in Fig. 1. They are now welded together in any convenient way, preferably electrically, and the joined ends of the two pipes accurately squared as at 5; a hollow cap 6, preferably drop-forged, with its lip or edges shaped to conform with the edges of the joined pipe ends is now placed upon said ends and the abutting edges welded together. This cap is preferably forged so that it is thickest at the center, gradually thinning off until at its edges the thickness is equal to that of the pipe walls.

Referring to the modification shown in Figs. 2 to 5 inclusive each pipe length 7, after having had an end first approximately squared off, is swaged conically to about ¼″ internal diameter at the extreme end. At a point 8, a convenient distance from its end, the pipe is then given a reverse bend and at a point 9, between point 8 and the extreme end, the pipe is given an offset bend in the same direction as the reverse bend; the pipe end is then planed off on the side toward which it has been bent as at 10, said plane being parallel to the axis of the pipe, as in the construction of the pipe bend shown in Fig. 1. The planed edges of the two pipe bends are then abutted and welded as before. A metal button 11, preferably solid, is then welded upon the end of the joined pipes to close the small opening left by the swaging.

While in the preceding description of the construction shown in Figs. 2 to 5, I have referred to the plane 10 (along which the pipe end is planed) as being parallel to the axis of the pipe, I do not limit my invention to the use of this particular plane but may, if I choose, plane the sides of the pipe ends along other planes which are not parallel to the axis of the pipes. In such cases the reverse bend at 8 should be correspondingly varied. In this way the opening at the end of the pipes, when their planed edges are abutted, will also vary from complete closure to a size even greater than that shown in the figures. When the closure is complete no button will be needed and in the other cases a button will be chosen of size commensurate with the opening. Similarly, I do not limit myself to an initial swaging which will leave the pipe end open or which will leave the opening of any particular size as conditions may arise which would require variation in the character of the combined pipe end. If the swaging is carried so far as to close the end of each pipe they will, when welded together, have their combined end closed without the aid of the button 11.

The order in which the several bends and the squaring off of the ends are accomplished is immaterial and practically a matter of convenience.

As will be noted from the preceding description of my improved method, there is practically no material wasted and no special dies or other tools are necessary. A bend, according to my invention, can be made by any mechanic reasonably skilled in the art of forging. The thickened cap 6 or solid button 11 provides a maximum of material at a point where the pipe bend, in superheater construction as ordinarily practised, receives the maximum heating.

Having described my invention, I claim:

1. The method of making U shaped pipe bends which comprises displacing an end portion of each of two pipes laterally by bending, planing off said portion on the side toward which it has been displaced so as to make an opening through the pipe wall, abutting the planed edges of the two openings and then welding them together.

2. The method of making U shaped pipe bends which comprises displacing an end portion of each of two pipes laterally by bending, planing off said portion on the side toward which it has been displaced so as to make an opening through the pipe wall, abutting the planed edges of the two openings and welding them together, and then closing the ends of the joined pipes.

3. The method of making U shaped pipe bends which comprises displacing an end portion of each of two pipes laterally by giving said portion a reverse bend and also an offset bend between the reverse bend and the end proper of the pipe, swaging down said portion for a short distance from said end proper, planing off said portion on the side to which it has been displaced so as to make an opening through the pipe wall, abutting the planed openings of the two pipes and welding them together, and closing the ends of the joined pipes.

4. The method of making U shaped pipe bends which comprises displacing an end portion of each of two pipes laterally by giving said portion a reverse bend and also an offset bend between the reverse bend and the end proper of the pipe, swaging down said portion for a short distance from said end proper, planing off said portion on the side to which it has been displaced so as to make an opening through the pipe wall, abutting the planed openings of the two pipes and welding them together, and welding a cap upon the ends of said joined pipes.

In testimony whereof, I have hereunto set my hand in the presence of two subscribing witnesses.

JULIUS KINDERVATER.

Witnesses:
   JNO. S. AGNEW,
   L. E. DINGMAN.